Sept. 26, 1950  S. A. NILSSON  2,523,714
ADJUSTABLE PNEUMATIC SUSPENSION SPRING
AND SHOCK-ABSORBING DEVICE
Filed June 19, 1945
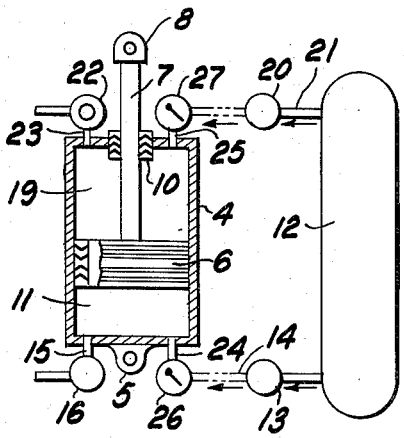
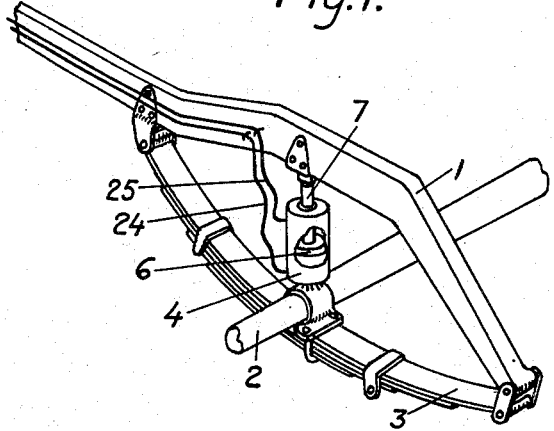
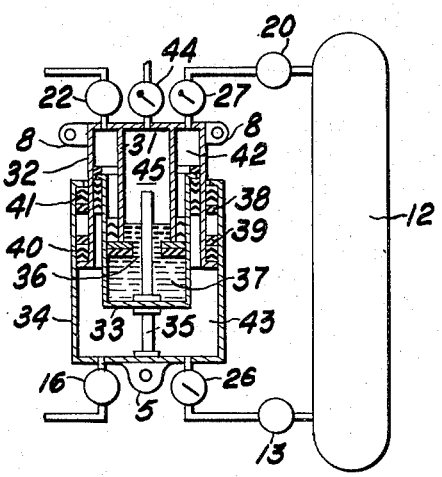
INVENTOR
Sven Arild Nilsson Patented Sept. 26, 1950

2,523,714

UNITED STATES PATENT OFFICE 2,523,714

ADJUSTABLE PNEUMATIC SUSPENSION SPRING AND SHOCK ABSORBING DEVICE

Sven Arild Nilsson, Stockholm, Sweden, assignor, by mesne assignments, to Sven Arild Nilsson Swallert, Stockholm, Sweden Application June 19, 1945, Serial No. 600,335
In Sweden April 26, 1944

1 Claim. (Cl. 267—64)

The present invention relates to an adjustable suspension spring and shock absorbing device mounted between a load and its support.

The invention is useful for vehicles of all kinds and particularly for motor cars for general purposes, in the country over bumpy grounds, and for trucks, lorrys and busses exposed to varying heavy loads.

If a vehicle is provided with ordinary springs dimensioned for maximum load, the springs will offer very little spring action when slightly loaded, wherefore the chassis and the vehicle body as well as passengers will be exposed to heavy and uncomfortable shaking. The life of such a vehicle will be relatively short, due to the fact, that the body will by and by be shaken to pieces.

The present invention solves the problem of furnishing a soft springy action to the chassis and the body when unloaded as well as when heavily loaded.

The invention generally consists in an adjustable pneumatic suspension spring and shock absorbing device mounted between a load and its support and comprising a piston mounted for movement in a substantially cylindrical device divided in at least two closed compartments by the said piston, each compartment being connectable to a compressed fluid source for admitting to each compartment a fluid of desired pressure corresponding to the prevailing load for its suspension and rebound.

The invention will be further described in connection with the accompanying drawings, in which:

Fig. 1 diagrammatically shows part of a chassis and an axle belonging to a vehicle and provided with a combined mechanical and an adjustable pneumatic suspension spring and shock absorbing device.

Fig. 2 diagrammatically shows an adjustable pneumatic suspension spring and shock absorbing device according to the present invention.

Fig. 3 shows a modification of Fig. 2, whereby the device is combined with an auxiliary shock absorbing device within the cylindrical device.

In Fig. 1 is shown part of an axle 2 and part of a frame or chassis 1, provided with mechanical springs 3 preferably adjusted to the weight of the body or a slight load. Between the frame and the axle there is provided a cylindrical device 4 provided with a piston 6 and piston rod 7 according to the present invention, as shown in more detail in Fig. 2 or Fig. 3, whereby the piston is shown coupled to the frame and the cylindrical device to the axle.

If the cylindrical device and the piston rod were provided with sliding guides to prevent lateral dislocation of the frame with respect to the axle system, mechanical springs would be unnecessary, and the entire suspension could be effected by means of the adjustable pneumatic suspension spring.

In Fig. 2 the pneumatic cylinder 4 is at its lower part 5 movably attached to a support, for example a vehicle axle 2, Fig. 1. In the cylinder there is a piston 6 provided with effective packing rings provided with flips so directed that compressed fluid is prevented from passing from the lower compartment 11 to the upper compartment 19 and vice versa.

A piston rod 7 is by means of an eye 8, for example, movably attached to the frame 1, Fig. 1. The piston rod passes the upper cylinder wall through an airtight packing 10.

The lower compartment 11, in which enclosed air is compressed by the load of the vehicle, can be connected by a pipe 14 at least in part flexible with a source 12 of compressed air over a manually adjustable inlet valve 13 and a check valve 26. The compartment 11 can further be connected with the free atmosphere by means of a pipe 15 over a manually adjustable discharge valve.

When a vehicle provided with the present invention without load is conducted over a relatively good road, a satisfactory spring action can be obtained, if valve 13 is closed and the compartment 11 by the valve 16 is connected to the free atmosphere. In such a case the vehicle will rely only on the normal mechanical springs, if the vehicle is provided with such springs.

If the driver, however, finds that a greater stiffness of the spring action is desired, for example, if the vehicle is fairly loaded, or if conducted over a bumpy road, he can first close the valve 16. In such a case the air enclosed in the compartment 11 will, upon lowering of the piston 6 be compressed, so that a lowering of the piston will be counteracted.

Should greater stiffness be desirable, the driver can by momentarily opening valve 13 admit a further amount of compressed air of desired pressure from the pressure source 12 to the compartment 11. If a softer spring action is again desired, valve 16 can be opened to let part or all of the compressed air escape.

In order to lessen a shock, which might occur, if the piston should touch bottom of the cylinder, the piston rod outside the cylinder can in known manner be provided with a spring, a rubber cushion or the like, which can be arranged to act only when danger of metallic shock occurs. In order to lessen a shock, which might occur, if the pneumatic spring device is stretched too far, the piston rod 7 can be provided with a similar spring or rubber cushion between the upper wall of the cylinder and the piston.

The upper compartment 19 can, however, be connected to a source of pressure 12 over a pipe 25, a check valve 27, an inlet valve 20 and a pipe 21. A discharge valve 22 can be provided for communicating the compartment 19 with the free air.

By enclosing a suitable quantity of air in the upper compartment 19, said air will prevent an over-stretching of the pneumatic spring device.

The pressure source 12 is shown as a pressure storage tank, which from time to time must be supplied with air of the proper pressure. In vehicles provided with a compressor, the storage tank can be permanently or temporarily connected with said compressor. If desired some of the pipes 14, 15, 21 and 23 may be connected to other pneumatic spring devices of the same vehicle, so that the connected pipes may be operated by common valves 13, 16, 20 and 22 respectively.

It might, however, be more suitable to provide each pneumatic spring device with separate valves, as in some cases a better spring action can be obtained particularly if a vehicle is unevenly loaded.

The pneumatic spring device can be combined with a shock absorbing device, for example of the air-oil type used for shock absorbing purposes for landing wheels in airplanes.

In this case the device can, as shown in Fig. 3, be provided with four concentric cylinders 31, 32, 33, 34, of which the two upper ones are provided with a common upper end wall.

The end wall of the inner intermediate cylinder 33 is located at its lower end, and the upper open end of this cylinder is provided with ringshaped packings acting between this cylinder 33 and the outer intermediate cylinder 32. The innermost cylinder 31 is at its lower open end provided with a packing acting between this innermost and the inner intermediate cylinder 33. The outer intermediate cylinder 33 is thus axially slidable with respect to the two upper cylinders 31, 32. The cylinder 33 is at its bottom provided with a bar 35 of suitable diameter and so arranged that the bar upon the relative movements of the inner and intermediate cylinders passes through a hole 36 at the lower end of the innermost cylinder 31. In the lower parts of the innermost and inner intermediate cylinders 31 and 32 there is provided a certain amount of oil, while the upper part of the cylinders contain air, the pressure of which is adjustable as described in connection with Fig. 2.

The cylinder 4 and piston 6 in Fig. 2 are in Fig. 3 replaced by the outermost cylinder 34 and the outer intermediate cylinder 32 movably arranged with respect to each other, and between which packings 40 and 41 are arranged.

The outer intermediate cylinder 33 serves as division between the upper and lower compartments instead of the piston shown in Fig. 2 and is rigidly attached to the outermost cylinder 34 by means of the bar 35.

When the cylinders 31—32 and 33—34 are moved towards each other the air in the lower compartment 43 and in the upper compartments 42 and 45 is compressed and counteracts the movements in a similar manner as shown in Fig. 2.

The volume of the space between the bottom of the intermediate cylinder 33 and the bottom of the innermost cylinder 31 is then lessened, whereby the oil is pressed through the ringshaped slit between the bar 35 and the edge of the opening 36 in the bottom of the innermost cylinder into the latter. By suitably choosing the diameter of the bar, a desired resistance against movement can be obtained, when the oil is pressed through said slit. When movement again takes place in the opposite direction, the oil is pressed back through the slit by the air pressure at the top of the said interior cylinder.

If no damping is desired in said opposite direction, a return valve can in known manner be arranged to allow the oil to return to the intermediate cylinder 33.

In order to prevent too much stretching of the device, rubber cushions 38—39 can in known manner be provided between flanges of the two outside cylinders.

The two cylinders 34 and 32 can be attached in known manner for example by eyes 8 and 5 to a frame respectively an axle. Valves for admitting pressure fluid from a storage pressure tank 12 can be arranged as shown in Fig. 2. The inner cylinder 31 is provided with an extra valve 44 for introducing oil to chambers 45 and 37 and for putting the chamber under increased pressure, for example by connecting the chamber 45 with a pressure source or for connecting it with the free air.

Having now particularly described and ascertained the nature of my said invention and in what manner the same is to be performed, I declare that what I claim is:

A device of the class described, comprising a pair of upper concentrically arranged and integrally secured cylinders, and a pair of lower integrally secured, concentrically arranged cylinders movable independently of the first pair of cylinders, said pairs of cylinders being telescopic with respect to each other and including packing rings therebetween so as to effect three concentric compression chambers, means connected to the respective upper and lower cylinders for introducing compressed air to the outer two chambers thereof, and valve means connected to the respective upper and lower cylinders for relieving said compressed air, valve means connected to the upper innermost cylinder for introducing oil into said innermost chamber and a metering orifice intermediate the two innermost cylinders through which said oil flows during relative reciprocal motion therebetween.

SVEN ARILD NILSSON.

REFERENCES CITED

The following references are of record in the file of this patent:

UNITED STATES PATENTS

| Number | Name | Date |
|---|---|---|
| 1,011,560 | Bertschy | Dec. 12, 1911 |
| 1,151,350 | Fox | Aug. 24, 1915 |
| 1,244,752 | McCrosson | Oct. 30, 1917 |
| 1,289,728 | Giles | Dec. 31, 1918 |
| 1,291,016 | Kellogg | Jan. 14, 1919 |
| 1,366,318 | Gruss | Jan. 18, 1921 |
| 2,057,893 | Gross | Oct. 20, 1936 |
| 2,353,293 | Brooking | July 11, 1944 |